W. W. CRAWFORD.
METHOD OF AND APPARATUS FOR PRODUCING HIGH VACUUM.
APPLICATION FILED JAN. 8, 1917.

1,367,865.

Patented Feb. 8, 1921.

Inventor
William W. Crawford
By Cornelius D. Ehret
his Attorney

W. W. CRAWFORD.
METHOD OF AND APPARATUS FOR PRODUCING HIGH VACUUM.
APPLICATION FILED JAN. 8, 1917.

1,367,865.

Patented Feb. 8, 1921.

UNITED STATES PATENT OFFICE.

WILLIAM W. CRAWFORD, OF PHILADELPHIA, PENNSYLVANIA, ASSIGNOR TO VICTOR ELECTRIC CORPORATION, OF CHICAGO, ILLINOIS, A CORPORATION OF NEW YORK.

METHOD OF AND APPARATUS FOR PRODUCING HIGH VACUUM.

1,367,865.     Specification of Letters Patent.     Patented Feb. 8, 1921.

Application filed January 8, 1917. Serial No. 141,326.

*To all whom it may concern:*

Be it known that I, WILLIAM W. CRAWFORD, a citizen of the United States, residing in the city of Philadelphia, county of Philadephia, and State of Pennsylvania, have invented a new and useful Method of and Apparatus for Producing High Vacuum, of which the following is a specification.

My invention relates to a method of and apparatus for producing very high vacua or very low pressures, of the order of .00004 of a millimeter of mercury, more or less, in X-ray tubes or other electrical vacuum tubes, or any other chambers.

My invention resides in providing proportions and conditions of operation which render a vapor aspirator or ejector structure operative in producing these extremely high vacua. My method consists in entraining the gas to be pumped in a jet of vapor, for example, mercury, cadmium, hydrocarbon oils, etc., which has an extremely high velocity and high degree of rarefaction due to its having been expanded from a high initial pressure, five to ten millimeters of mercury, or higher, to a considerably lower pressure, estimated as one-tenth to one hundredth of a millimeter of mercury. I find that a jet so produced will even when surrounded by a high vacuum preserve its form as a free jet to a sufficient extent to enable it to entrain not only the gas to be pumped, but a great proportion of the vapor diffusely turned from the hot walls of a tube which I sometimes employ surrounding the jet, and which I call the compression passage (corresponding to the so-called diffuser of a high pressure aspirator) and will expel such gas and vapor together into a chamber in which the pressure is many times greater than the pressure in the vacuum space. The degree of expansion is such that a specially absorptive condition of the jet is produced, enabling the jet to entrain gas whose pressure is only a small fraction of the pressure in the jet.

My present explanation for the fact that the jet preserves its form when surrounded by a high vacuum is that in consequence of the cooling of the vapor due to its very great expansion the relative multi-directional velocities of the individual molecules are much reduced, while all the molecules acquire a common high velocity in the direction of the jet. The resultant velocities of the great majority of the molecules passing a given point are hence nearly equal and parallel. I therefore refer to a jet of this type as a parallel or uni-directional jet.

Collisions between such approximately parallel-moving molecules are fewer and when occurring result in practically unchanged directions of motion, so that the number of molecules which escape from the jet is very small.

There is a sorting action among the molecules of the free jet so that those molecules having widely divergent directions and magnitudes of velocity tend to collide and be eliminated from the jet, so that the farther the jet proceeds before striking an obstacle or before entering a region of higher pressure, the greater its purity as to parallelism of molecular motion and the less its tendency to scatter. For this reason I sometimes introduce a partition or diaphragm through an orifice in which the free jet passes. The diaphragm separates and causes to condense in a separate chamber the vapor which escapes from the free jet, and the gas to be pumped enters the jet beyond the diaphragm in the region in which the jet is most completely uni-directional.

Free parallel jets of a high degree of purity have hitherto been produced under conditions of extreme rarefaction of the vapor, but it is, so far as I am aware, my discovery that it is possible to produce a parallel or uni-directional vapor jet of sufficiently high density, that is, of sufficiently large amount of vapor per unit of volume within the vapor jet to be operative kinetically in overcoming a considerable back pressure.

The practical criterion for the recognition of a parallel jet is, as stated, the substantial absence of scattering or diverging of the vapor even when the jet is surrounded by a very high vacuum, and the method by which the parallel jet used in my invention is produced is, as stated, the combination of a high expansive cooling and high velocity with a final pressure and density within the jet lower than that employed hitherto in vapor aspirators and higher than that hitherto employed in parallel jets.

From an abstract standpoint it appears that the more nearly equal and parallel the molecular velocities become, the better the results, and if the velocities were absolutely equal and parallel, there would be no lateral pressure. Practically, however, it is found that only the degree of expansion stated is necessary. Computing by the customary method according to the laws of adiabatic expansion, it appears that in the actual jets produced, the lowest pressures are not lower than one-tenth to one-hundredth millimeter of mercury, yet in actual operation these jets remove gas from the vacuum space when the pressure there is only one hundredth (1/100) to one thousandth (1/1000), or a less fraction, of the computed pressure in the jet. The customary methods of calculation may be in error when applied to such low pressure jets, but it would seem that the principal error is that due to ignoring friction, which would result in the actual velocity being lower, and the pressure higher, than stated above.

The term pressure is here used in the ordinary sense of an actual mechanical force between adjacent portions of the vapor, due to the impacts set up by molecular collisions.

The fact that the pressure in the vacuum space is actually lower than that in the jet is further verified by tests which have been made with a continual leakage of gas into the vacuum space, and varying the density of the jet. When the density is above a certain limit, the pressure in the vacuum space is about equal to the computed pressure in the jet, the device then operates as an ordinary aspirator. On lowering the density of the jet below said limit, there is a sudden and very great decrease of pressure in the vacuum space, out of all proportion to the decrease in the computed pressure in the jet.

In consequence of the practical certainty that a small but appreciable pressure exists within the jet at the point of entrainment, the language used above in explaining the parallel character of the molecular motion is made to admit of slight lateral and longitudinal relative motion of the molecules. Clearly, appreciable lateral components of the velocities can exist, and the total velocities still be in a direction which will carry the molecules away from the vacuum space and through the compression passage without a large proportion of them striking the walls.

Inasmuch as it is difficult to determine the pressure of the vapor in such a jet, I prefer to define the conditions in terms of the density and the molecular weight. For example, with a mercury vapor jet transferring .05 gram per second at an estimated velocity of 25,000 centimeters per second through a passage whose area is 5 square centimeters, the density is evidently .05 gram per 125,000 cubic centimeters, or $4 \times 10^{-7}$ gram per cubic centimeter. The condition of molecular flow depending primarily on the number of molecules per cubic centimeter, I divide this value by the molecular weight, giving a result of $2 \times 10^{-9}$ gram-molecules per cubic centimeter, which I refer to as the molecular density of the jet. This value is suitable for a jet producing high vacua, and applies approximately to conditions which have been produced in practice, but my invention is not limited thereto, inasmuch as considerably higher or lower values may be used.

One advantage of the parallel jet is the elimination in a practical sense of the tendency of the molecules to diverge and strike at considerable angles the walls of the container or passage or to enter the vacuum space, from which follows the practical result that the countercurrent of the vapor, especially from a hot compression passage, is reduced to such extent that it does not interfere with the entry into the jet of the gas to be removed or pumped.

Where the vapor jet is projected through a compression passage, the angle of incidence of the vapor in the jet with respect to the wall of the compression passage should be acute, and preferably less than 30 degrees, and, in general, the more acute this angle the better; and the more completely uni-directional the jet, the smaller or more acute may this angle be made and the more effective the action.

As a practical consideration, not only must the molecules passing a given point move in parallel directions, but this direction must be nearly the same in different adjacent parts of the jet. The maximum angle of divergence should not be over 60 degrees, and where a cylindrical compression passage is used, it should be less than this. This is necessary to permit the jet at all points to strike the wall at a sharp angle (less than 30 degrees).

Those molecules of the vapor striking the wall even at grazing incidence are, it is believed, diffusely returned from the wall, that is, at angles distributed in all directions practically independent of the angle of incidence. When the angle of incidence of the jet against the wall is small, as specified, the number of such molecules which can return directly into the high vacuum space is very small compared to the number which are re-entrained by the jet. This is my present explanation of the observed fact that in my pump a blast of vapor into the high vacuum space sufficiently dense to prevent the flow of gas into the jet does not occur. A very slight amount of vapor does flow back into the high vacuum space and condenses there at a considerable distance from the nozzle, whenever the temperature of any part of the vacuum chamber is sufficiently low. This is a common feature of all vacuum pumps containing a vaporizable substance, for example, a liquid mercury piston pump with an ice or liquid air bath on the vacuum connection. In my pump such counterflow involves only a minute fraction of the amount of vapor passing through the jet, e. g., in the pump of Fig. 1 in the course of several hours not enough mercury had condensed in the vacuum space to drain from the walls.

The manner in which I believe that the flow of gas from the vacuum space into the jet is brought about, despite the higher pressure in the jet, is as follows:—

Because of the parallel or uni-directional character of the vapor jet and because the stream of gas to be exhausted is also largely a uni-directional jet, the directions of flow of the two jets being more or less closely coincident, a molecule of gas travels with and into the vapor jet for a relatively great distance before collision with a molecule of the vapor, and further, when it does collide, cannot acquire a backward velocity; the molecule thereby becomes effectively entrapped in the vapor. This entry of the gas into the vapor is a special and novel variety of molecular flow, which is characteristically different from the action in high pressure pumps as well as so-called diffusion or other low pressure pumps, molecular flow being characterized by the substantial disappearance of collisions between molecules of the entering gas and the vapor. This special variety of molecular flow which I call parallel molecular flow, is characterized by the fact that it will occur at higher densities of the medium than ordinary or multi-directional molecular flow.

This explanation is in accord with the well-known fact that the pressure exerted between two bodies of elastic fluid in contact under any conditions whatsoever is not localized in the surface forming the assumed mutual boundary. The pressure is due to the collisions of the molecules of one body with those of the other body. It is exceptional for two molecules to meet exactly in the boundary surface. The collisions, and the pressure, are distributed throughout a layer of appreciable depth on both sides of the surface.

Consequently, the pressure of the vapor within the jet cannot act on the gas from the vacuum space until the gas has penetrated an appreciable distance into the vapor. When this has occurred, the high velocity of the jet comes into play to sweep at least part of the gas molecules along with the jet.

This theory necessitates the supposition that there is an unbalanced pressure in the outer layer of the jet, the tendency of which would be to alter the motion of the vapor molecules in the outer layer, and drive them outward, or even toward the vacuum space. In view of the low pressure in the jet, and the high velocity, it appears that a given body of vapor is not in contact with the vacuum space long enough for this alteration of motion to take place to any great extent.

It is further characteristic of my method and apparatus that artificial cooling, particularly at the region of entry of gas into the vapor, is unnecessary, and in a practical sense inconvenient and undesirable, since it does not sensibly improve the speed or attainable vacuum of the pump.

The result, produced by my method that the pressure in the vacuum space is far lower than and of a different order of magnitude from the lowest pressure in the vapor stream is tangibly different from that in the high pressure vapor aspirators producing partial vacua, in which, as far as I am aware, the lowest pressure produced is little, if any, lower than the lowest pressure in the jet. My method in producing this desirable result differs from the method of the high pressure aspirator in that I expand the vapor until a condition of parallel molecular flow, as described and defined, sets in, which requires expansion to a pressure and density within the stream of a lower order than is employed in high pressure vapor aspirators. My difference in method and apparatus from other high vacuum pumps consists in the fact that in my pump the entrainment of the gas into the body of the jet is brought about by the absorptive condition of the jet, whereas in the other methods and apparatus, special structural means of entrainment are employed.

In the so-called condensation type of pump, the gas becomes entrapped or intermixed with the vapor at and in the region of condensation on an artificially cooled surface, whereas by my method the gas enters the free jet and is elevated to the intermediate pressure prior to the condensation of an appreciable portion of the vapor. Condensation is in my invention solely a means of enabling the medium to return to the vaporizer by gravity, it takes place at a distance from the point of entrainment and has no function in preventing the backward flow of vapor from the entrainment region to the vacuum space, said function being provided by the parallel or uni-directional character of the jet. With certain forms of parallel jet, the introduction of a confining or containing space in the entrainment and compression regions is totally unnecessary (see Fig. 7). In the condensation pump the jet has a certain degree of kinetic character in overcoming the back pressure, but the necessity of local cooling at the point of entrainment to prevent the flow of a dense vapor stream into the vacuum space shows that it has not the parallel character of my jet.

In the so-called diffusion pump, the vapor stream exerts a substantially uniform pressure in all directions at the point of entrainment, and this pressure is higher than the back pressure. The stream does not have the character of a kinetic jet. With equal opportunity the vapor would tend to flow equally into the vacuum and discharge spaces, and it is necessary to provide a substantially continuous wall to confine the stream. The vapor enters the stream by passing through a minute orifice in this wall, a phenomenon analogous to the well known diffusion of gases through a porous membrane. My method is fundamentally distinct from that of the diffusion pump as well as the condensation pump in the self-continent character of the parallel free jet which I employ.

For an illustration of my method and some of the forms my apparatus may take, reference is to be had to the accompanying drawings, in which.

Figures 1, 2, 11:
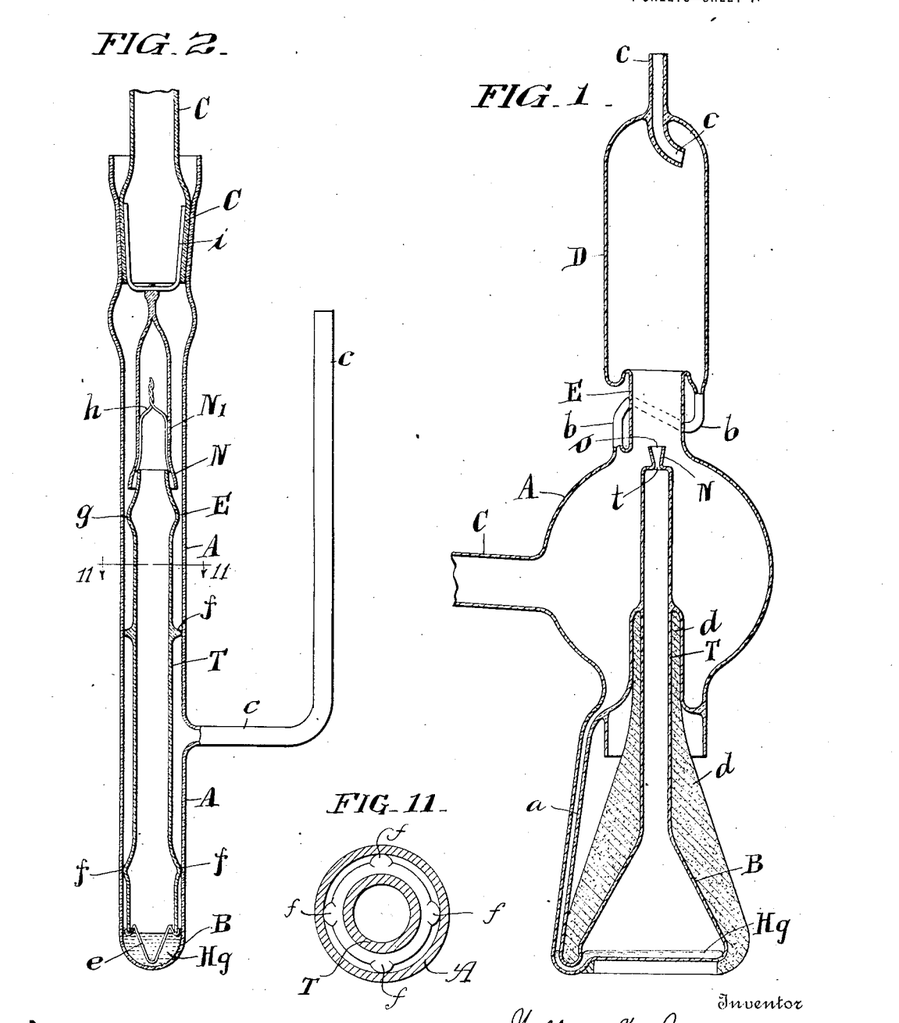
Figure 1 is a vertical sectional view through a pump embodying my invention.
Fig. 2 is a vertical sectional view of a modified construction in which the expansion nozzle and compression passage are of annular form.
Fig. 11 is a section taken at the line 11—11 on Fig. 2 and viewed in the direction of the arrows.

Referring to Fig. 1, B is a boiler of glass, metal or other suitable material, in which is a mass of mercury or other suitable material Hg which is adapted to be vaporized by the application of heat, as by a Bunsen burner, electric heater, or otherwise, to the bottom of the boiler B. Leading from the boiler B is the vapor conducting tube T communicating with the expansion nozzle N having the restricted throat $t$, the cross sectional area of the passage within the nozzle N increasing to the orifice $o$. Surrounding the nozzle N is the chamber A with which communicates the tube C communicating with the X-ray tube, vacuum tube or other chamber from which gas is to be removed, to cause therein a very low pressure or high vacuum. With the bottom of the chamber communicates a tube $a$ communicating with the bottom of the boiler B to return thereto the condensed mercury or other material employed. D is a second chamber with which the chamber A communicates through the compression passage E, a tube $b$ leading from the bottom of the chamber D into the chamber A. The tube $c$, laterally deflected within the chamber D, communicates with a preliminary or rough vacuum pump.

The boiler B, except at its heat receiving bottom, may be covered with lagging or material of poor heat conductivity, indicated at $d$, which may also extend upwardly around the tube T. Or any other suitable means may be employed for preventing heating of the apparatus above the boiler B, though such provision is not necessary and my invention is not limited thereto.

The preliminary or rough vacuum pump maintains within the chamber D a pressure of from .02 to 1 millimeter of mercury, more or less.

The operation is as follows:

Heat is applied to the bottom of the boiler B at such rate that the pressure within the boiler amounts to from 10 to 100 millimeters of mercury, the boiler wall attaining a temperature of 260 degrees C., more or less.

Under this relatively high boiler pressure the mercury or other vapor is delivered through the tube T through the throat $t$ and is expanded through the nozzle N, attaining at the nozzle orifice an exceedingly high velocity estimated as from 20,000 to 50,000 centimeters per second, and a temperature much lower than the boiler temperature. This insures a parallel jet of vapor which is directed into the compression passage E, a portion of the vapor striking the walls thereof at an acute angle. The gas to be removed passes from the vessel to be evacuated through the tube C into the chamber A and thence by molecular flow into the vapor jet between the nozzle N and passage E. The gas enters a great distance into the vapor jet before collision with the vapor molecules, and the mixture of gas and vapor is delivered at relatively far higher pressure into the chamber D, wherein a separation between the vapor and the gas takes place, because the vapor is condensed, particularly at the upper end of the chamber D, while the gas passes out through the tube $c$ to the preliminary or rough vacuum pump, which then again steps the pressure up to atmospheric. The vapor condensing within the chamber D again becomes liquid and collects at the bottom of the chamber D and flows through the trap or siphon tube $b$ and drops through the chamber A to its bottom, from which it is delivered by tube $a$ back into the boiler B. The lateral deflection of the tube $c$ within the chamber D largely prevents vapor from entering the tube.

In the compression passage E the volume of the vapor is again reduced after expansion, or at any rate is prevented from further increasing in volume. Between the orifice *o* of the nozzle N and the point of incidence of the vapor upon the inner wall of the passage E the vapor jet maintains its form as a free jet, without material fringing or dispersion.

The high velocity and resultant high kinetic energy of the vapor enables a small quantity of vapor to overcome the back pressure, which is of decided advantage in enabling operation with a highly rarefied jet into which the gas will penetrate readily.

The jet in this pump is invisible, indicating that the vapor in the jet does not condense, although cooled by expansion considerably below the saturation point. I attribute this to the short time and few collisions in the jet and the absence of condensation nuclei. The vapor is hence in a super-saturated condition. This is not an essential feature of my method, however, which would operate equally well if a considerable portion of the vapor condensed within the jet in the form of minute droplets, which would entrain and expel the gas in a manner similar to the molecules of the vapor. Such condensation could be provided, for example, by atomizing liquid mercury into the jet at the throat *t*.

It is the uncertainty as to the exact condition of the vapor jet as regards condensation of liquid drops within the jet that has led me to lay little emphasis on numerical values of velocities in describing my invention. The assumption that the vapor expands adiabatically like an ideal gas leads to one set of velocities, temperatures and densities. The assumption that it expands as a perfect vapor leads to velocities approximately twice as high corresponding to about four times as much energy, said increased supply of energy being theoretically attained by the liberation of latent heat due to condensation within the jet, as is well known in steam practice. The second assumption further leads to higher final temperature, and consequently greater relative molecular velocities, but since the translational velocity is also much greater, the relation essential to parallel flow remains. That is, the existence of the free parallel jet does not prove or disprove either theory, but the transparency of the jet favors the first. Consequently, I prefer to assign somewhat arbitrarily for purposes of discussion velocities between the limits of 20,000 and 60,000 centimeters per second to the jets which I employ, existing evidence justifying a belief that the actual velocities lie within this range.

The compression passage E is preferably short and of large diameter, the length being preferably less than twice the diameter to minimize the frictional effects which are very large at such low pressures. In the passage E the kinetic energy of the jet is partially reconverted into pressure of the vapor and partially lost in overcoming friction, the vapor and gas entering the chamber D at reduced velocity but higher pressure.

So far as I am aware, I am the first to employ the relatively high boiler pressures above indicated, these boiler pressures being of a different order of magnitude, and I believe from 25 to 100 times higher than heretofore employed. The resultant velocity of the vapor jet is also of a different order of magnitude from what has heretofore been employed, though the exact ratio is difficult to estimate. The essential difference consists in the combination of high velocity, cooling due to expansion, and small angle of divergence of the free jet in my pumps, all of which are of a different order from those in previous pumps of the high vacuum class.

It is found that the compression passage E or the upper end of the chamber A, or both, may be heated from the exterior without materially affecting the behavior and efficiency of the pump. And in no case is it necessary to cool these parts, or either of them, or the parts within which is the region in which the gas enters the vapor. Even if the compression passage is cooled, it does not, as is the case in a condensation pump, cause most of the mercury to condense on the walls near the nozzle. In the pump of Fig. 1, cooling the compression passage E by ice did not seriously impair the parallel character of the jet, and the greater portion of the vapor still condensed in the chamber D, which remained at about 60 degrees C.

Without limiting my invention thereto, it may be stated, by way of example, that suitable proportions for a conical nozzle to produce a jet of the character used in my invention in the form of pump shown in Fig. 1, are as follows: Minimum or throat diameter, .040 inch; diameter of mouth, .25 inch; length from throat to mouth, .6 inch; diameter of compression passage (cylindrical) 1 inch; length, 2 inches. With a boiler pressure of about 35 millimeters, the jet produced by this nozzle was operative in producing vacua of the order of .00004 millimeter of mercury against a back pressure of about .03 millimeter, produced by the preliminary pump, and with a boiler pressure of 100 millimeters against a pressure of .1 millimeter or more. The molecular density at .1 millimeter pressure is about $5 \times 10^{-9}$, showing that the vapor was compressed to approximately 2.5 times its lowest density of $2 \times 10^{-9}$.

By the operation described, practically any degree of vacuum may be produced in the vessel communicating with the tube C. The speed of pumps of this type, when properly constructed in accordance with the principles described, may be expressed in Gaede units of the order of 1000 or more cubic centimeters per second.

In Fig. 2, the boiler B communicates with the upwardly extending tube or chamber A within which is the tube T whose lower end rests upon the wire or other spacer $e$, and which is held central within the tube A by the projections $f$, which occur at several points around its circumference. Near its upper end the tube T has its wall formed into the circumferentially continuous enlargement $g$ to form between the same and the inner wall of the chamber A the convergent-divergent compression passage E. Surrounding the upper end of the tube T is the member $N^1$, closed at its upper end, and centrally supported by the wire or other suitable member $i$, and open at its lower end, and suitably spaced by the wire spacer $h$ from the upper end of the tube T, the space between the upper end of the tube T and the lower end of the member $N^1$ constituting the expansion nozzle N. The supporting member $i$ flares upwardly and so maintains itself in the bottom of the tube C which communicates with the vessel to be evacuated. The tube $c$ communicates with the interior of the tube A and with the preliminary or rough vacuum pump.

In this case the mercury or other vapor passes upwardly through the tube T into the member $N^1$ and thence downwardly through the nozzle N, in which it is expanded, and the jet is directed into the compression passage E from which the mixture of the gas, entering through the tube C and entering into the jet below the nozzle N, is discharged at lower velocity and higher pressure into the tube A, in which the mercury or other vapor condenses and returns to the boiler B, while the gas passes out through the tube $c$ to the preliminary or rough vacuum pump.

Figure 3:
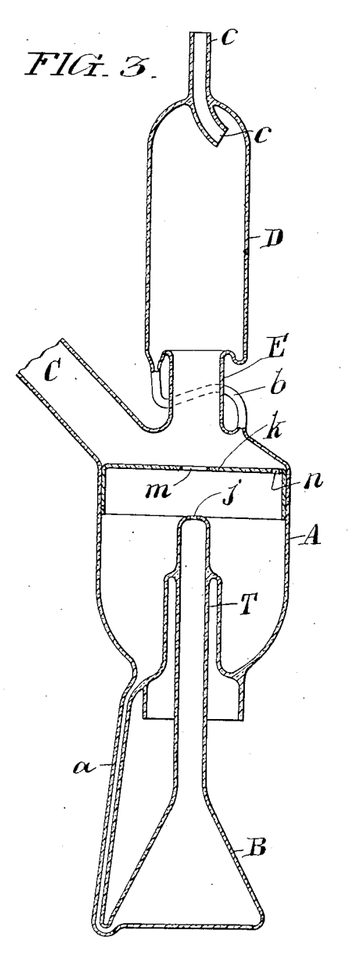
Figs. 3, 4, 5, 6, 7 and 8 are vertical sectional views of further modifications.

In Fig. 3 the structure is similar to that shown in Fig. 1, except that the nozzle N is supplanted by a closure at the upper end of the tube T provided with a small aperture $j$ through which the vapor is expanded. A diaphragm $k$ having the aperture $m$ is positioned above the orifice $j$ and serves to allow passage of the free vapor jet and intercepts that part of the vapor which issues from the orifice $j$ and tends to scatter or depart from the free jet, the intercepted vapor condensing chiefly on the walls of A, and passing back to the boiler through the tube $a$. Above the diaphragm $k$ is the compression passage E above which is the chamber D with which communicates the tube $c$ leading to the preliminary or rough vacuum pump. The vapor finally condensing in the chamber D returns as liquid through the tube $b$ to the upper side of the diaphragm $k$ which is provided with the passage or orifice $n$ through which the liquid returns to the bottom of the chamber A and thence through tube $a$ to the boiler B.

Figure 4:
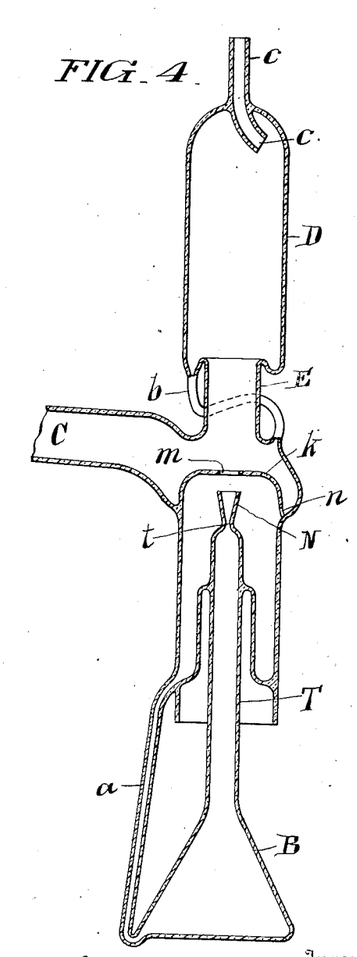

In Fig. 4 the structure is similar to that of Fig. 1, except that between the expansion nozzle N and the compression passage E is disposed a diaphragm $k$ such as described in connection with Fig. 3, the diaphragm $k$ in both cases serving to maintain a more perfect free jet.

Figure 5:
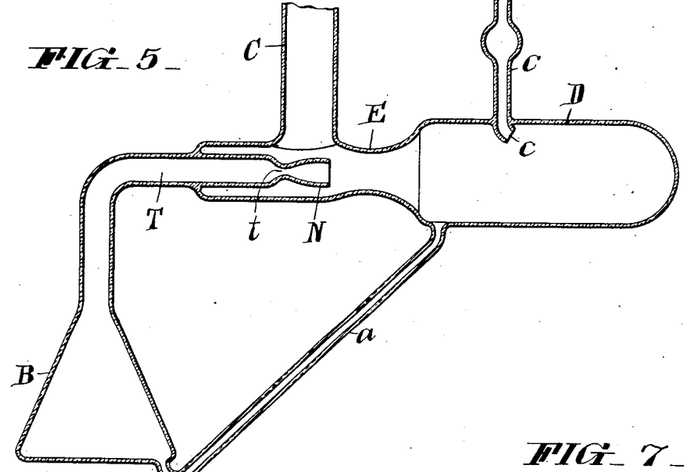

In Fig. 5 the structure is similar to that of Fig. 1, except that the tube T extends laterally or horizontally, as do also the nozzle N and the compression passage E, which latter in this instance is shown as convergent and then divergent, and the nozzle is curved to direct the jet more accurately than in Fig. 1.

Figure 6:
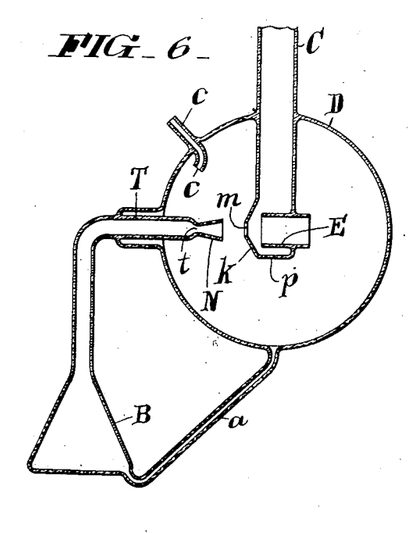

In Fig. 6 the tube T extends laterally or horizontally and communicates with the expansion nozzle N disposed within the chamber D through a wall of which extends the tube C communicating with the vessel to be evacuated, the tube $c$ communicating with the preliminary or rough vacuum pump. The lower end of the tube C is closed at $p$, and a lateral wall of the tube C forms the diaphragm $k$ having the orifice $m$, as in Figs. 3 and 4. The vapor expanded by the nozzle N passes through the orifice $m$ and thence through the compression passage E and is discharged into the tube D, the gas from the tube C entering the vapor after it has passed the orifice $m$ and before it enters the passage E. In this figure, the jet must have a less parallel character when issuing from the nozzle N, this condition being attained by using a smaller ratio of areas of mouth to throat of the nozzle than in Figs. 1 and 5, in order that the fringe of the jet between N and $m$ will be sufficiently dense to prevent gas from D entering the jet and so being carried into C. The true parallel character, and the entrainment, take place from $m$ to E.

Figure 7:
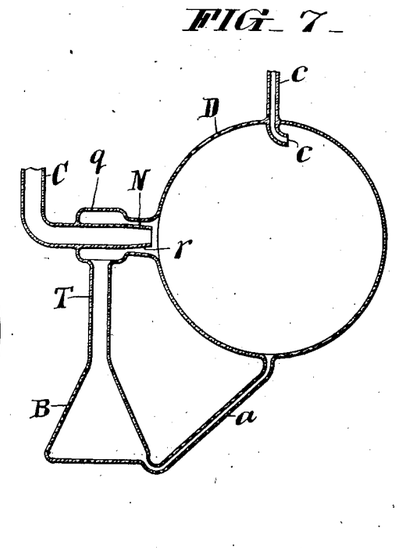

In Fig. 7 the tube T communicating with the boiler B communicates with a cylindrical chamber $q$ through which extends the tube C, which communicates with the vessel to be evacuated, the tube C terminating in a somewhat tapered part $r$. Around the part $r$ is the expansion nozzle N, of ring form, communicating with the chamber $q$. The vapor delivered from the expansion nozzle N into the chamber D forms a hollow jet into which is drawn the gas through the tube C, the mixture being delivered into the Chamber D. In this arrangement a compression passage is dispensed with, but there is in the interior of the chamber D a fairly definite compression region wherein the kinetic energy of the jet is reconverted into pressure. The only barrier against the relatively higher pressure of gas from the chamber D returning into the tube C is the vapor jet itself.

Figure 8:
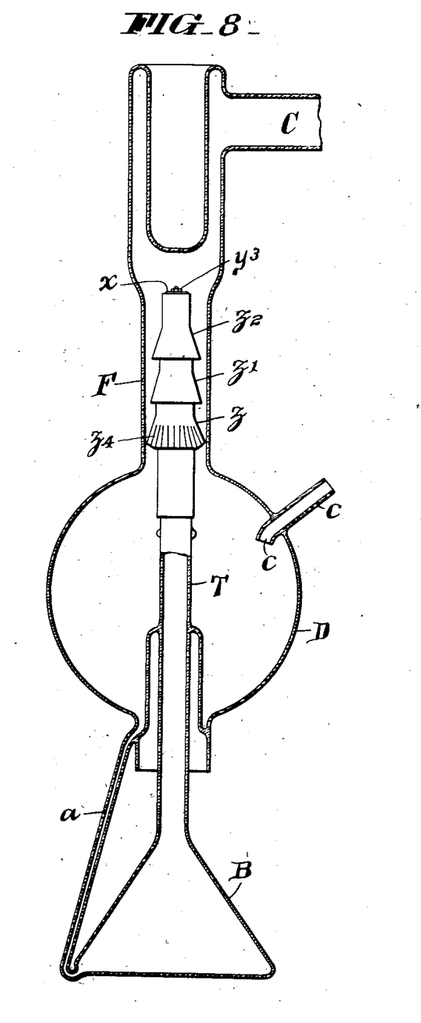
Figure 9:
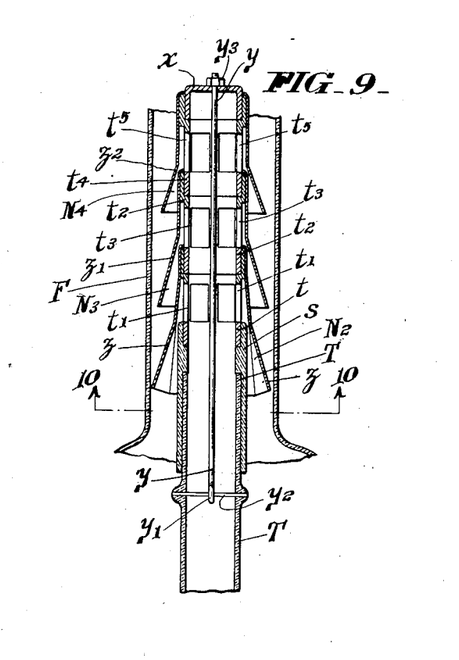
Fig. 9 is a vertical sectional view, on enlarged scale, of part of the apparatus shown in Fig. 8.

In Fig. 8 is shown a multi-stage type of pump, wherein the vapor generated in the boiler B rises in the tube T on whose upper end rests the sleeve or tube $s$, Fig. 9, on whose upper end rests the tube $t$ having the lateral openings $t^1$ and on whose upper end rests the member $t^2$ having the lateral openings $t^3$ and upon whose upper end rests the tube $t^4$ having the lateral openings $t^5$ and on whose upper end rests the closing cap $x$ through which extends the bolt $y$ having at its lower end an eye $y^1$ embracing the pin $y^2$ sealed in and extending across the bore of the tube T, a nut $y^3$ serving to force the cap $x$ downwardly and so hold the parts in firm assembly. The downwardly extending nozzle member $z$ is supported upon the member $t$, the second nozzle forming member $z^1$ is supported upon the member $t^2$, and the third nozzle forming member $z^2$ is supported upon the member $t^4$.

Vapor passes upwardly through the tube T and thence through the passages $t^1$ and thence through the narrow passage or throat formed between the inner wall of the flaring member $z$ and the upper end of the member $s$ through the expansion nozzle $N^2$ into the tube F, which delivers into the chamber D with which communicates the tube $c$ leading to the preliminary or rough vacuum pump. Vapor passes also from the tube T through the passages $t^3$ through the throat formed between the flaring nozzle member $z^1$ and the upper end of the member $z$, is expanded in the nozzle $N^3$ and delivered into the tube F; and vapor passes also from the tube T through the passages $t^5$ through the third expansion nozzle $N^4$ into the tube F.

The gas from the tube C enters the jet issuing from the nozzle $N^4$ by passing around the lower edge of the member $z^2$; the mixture of the vapor from the nozzle $N^4$ and the gas then passes downwardly past the lower edge of the member $z^1$ and is carried along by the vapor issuing from the nozzle $N^3$ past the lower edge of the member $z$, and vapor and gas are carried by the vapor issuing from the nozzle $N^2$ into the tube F and thence into the chamber D where the vapor condenses and returns to the boiler B through the tube $a$.

The nozzle $N^2$ delivers more vapor than the nozzle $N^3$, which in turn delivers more vapor than the nozzle $N^4$. Of these multiple nozzles, the uppermost, $N^4$, and its associated structure must be so proportioned and constructed as to produce high vacuum by producing a parallel or uni-directional jet. The areas for the entry of the gas, and mixtures of gas and vapor, become progressively smaller, the area of the passage around the nozzle member $z^2$ being greater than that around the nozzle member $z^1$, which in turn is larger than the area of the passage around the lower edge of the member $z$.

The successive stages raise the pressure of the gas entering from the tube C in successive steps until the relatively high pressure in the chamber D is attained.

Figure 10:
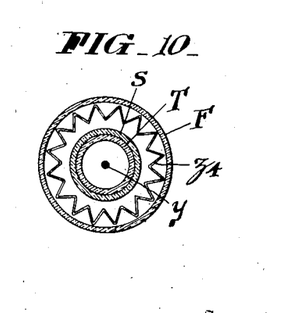
Fig. 10 is a horizontal sectional view taken on the line 10—10 of Fig. 9.

As seen in Figs. 8 and 10, the nozzle forming member $z$ may be corrugated, as indicated at $z^4$, in order to impart to the jet issuing from the nozzle $N^2$ a greater superficial area.

While I have described my apparatus as operating against pressures produced by the preliminary vacuum pump which are higher than the pressure in the vapor stream at the point of entrainment, my method and apparatus are equally operative if it happens that the preliminary pump is able to produce a pressure lower than the pressure in the vapor stream at the point of entrainment, and my invention is not limited to either condition.

It is further to be noted that my method and apparatus will remove from the vacuum space vapors as well as fixed gases.

While the hereinbefore described forms of apparatus are suitable for carrying out my method, it will be understood that the apparatus may be used to produce different boiler pressures, jet velocities and vapor densities than herein described in connection with my method, and other apparatus may be used for operating in accordance with the method described, without departing from my invention.

What I claim is:

1. The method of producing a high vacuum which consists in generating an actuating vapor, delivering said vapor by expansion in a free jet in which the vapor is expanded to such a degree that the velocity of the jet is so high in comparison with the relative velocities of the molecules therein that an approximately parallel molecular flow of vapor is produced in the jet, and admitting elastic fluid from the space to be exhausted into said jet.

2. The method of producing a high vacuum, which consists in generating an actuating vapor, delivering said vapor in a free jet in which the vapor is expanded to such a degree that a special absorptive condition of the jet is produced, whereby said jet is enabled to entrain elastic fluid whose pressure is substantially less than the pressure in the jet, and admitting elastic fluid from the space to be exhausted into said jet.

3. The method of producing vacuum higher than one-tenth of a millimeter of mercury, which consists in generating a motive vapor, as of mercury, having a pressure upward of two millimeters of mercury, expanding the motive vapor in a nozzle to produce a free jet in which the vapor pressure is of the order of one-tenth to one-hundredth of a millimeter of mercury, whereby a parallel jet is produced in which the individual velocities of the vapor molecules, relative to a molecule heaving the jet velocity, are small compared with the jet velocity, entraining the elastic fluid from the space to be evacuated by said motive fluid jet, and increasing the pressure of the mixture to a pressure below atmospheric by converting the kinetic energy of the mixture into pressure.

4. The method of producing vacuum higher than one-tenth of a millimeter of mercury, which consists in generating a motive vapor, as of mercury, having a pressure in excess of two millimeters of mercury and less than atmospheric pressure, expanding said motive vapor in a nozzle to produce a free jet whose molecular density lies between $10^{-7}$ and $10^{-10}$ gram molecules per cubic centimeter, entraining elastic fluid from the space to be evacuated by said motive jet, and increasing the pressure of the mixture to a pressure below atmospheric by converting the kinetic energy of the mixture into pressure.

5. The method of producing vacuum higher than one-tenth of a millimeter of mercury, which consists in generating a motive vapor, as of mercury, having a pressure in excess of two millimeters of mercury and less than atmospheric pressure, expanding said motive vapor in a nozzle to produce a free jet whose molecular density lies between $10^{-7}$ and $10^{-10}$ gram molecules per cubic centimeter, entraining elastic fluid from the space to be evacuated by said motive jet, increasing the pressure of the mixture to a pressure below atmospheric by converting the kinetic energy of the mixture into pressure, condensing the motive vapor and separating it from the compressed elastic fluid, and thereafter raising the compressed elastic fluid to higher pressure.

6. The method of producing a high vacuum which consists in generating an actuating vapor, delivering said vapor by expansion in a free jet in which the vapor is expanded to such a degree that the scattering of the jet when surrounded by a high vacuum is substantially nullified, and admitting elastic fluid from the space to be exhausted into said jet.

7. A vapor pump for producing high vacuum, comprising a boiler, an expansion nozzle having a throat and a nozzle passage increasing in cross-section from said throat, a connection from said boiler to said nozzle, a connection from the vessel to be evacuated to the space surrounding the jet issuing from said nozzle, a compression passage, a condensing chamber communicating with said compression passage, and a drain passage from said condensing chamber to said boiler.

8. A vapor pump for producing high vacuum comprising a boiler for producing motive vapor, means for expanding said vapor to produce a free jet, a condensing chamber through which said jet is directed, a compression passage into which said jet is delivered beyond said condensing chamber, a connection from the space to be exhausted to the space between said condensing chamber and said compression passage, and a second condensing chamber beyond said compression passage.

In testimony whereof I have hereunto affixed my signature this 5th day of January, 1917.

WILLIAM W. CRAWFORD.